US005960841A

United States Patent [19]

Green

[11] Patent Number: 5,960,841

[45] Date of Patent: Oct. 5, 1999

[54] FILLING YOKE FOR COMPRESSED GAS CYLINDERS

[75] Inventor: Edward E. Green, Eilat, Israel

[73] Assignee: Eilat Divers Supply Ltd., Eilat, Israel

[21] Appl. No.: 09/058,308

[22] Filed: Apr. 9, 1998

[30] Foreign Application Priority Data

Aug. 21, 1997 [IL] Israel ........................................ 121601

[51] Int. Cl.[6] ........................................ B65B 3/00

[52] U.S. Cl. .......................... 141/383; 141/347; 141/382; 141/386; 222/3

[58] Field of Search .................................... 141/347, 382, 141/383, 386; 222/3

[56] References Cited

U.S. PATENT DOCUMENTS

| | | | |
|---|---|---|---|
| 1,687,768 | 10/1928 | Heidbrink | 222/3 |
| 1,832,639 | 11/1931 | Kneeland | 141/383 |
| 1,927,170 | 9/1933 | Hornor | 222/3 |
| 2,288,565 | 5/1942 | Green . | |
| 2,498,596 | 7/1950 | Wallach | 222/3 |
| 3,136,344 | 6/1964 | Kollodge | 141/383 |
| 3,422,864 | 1/1969 | Allinquant | 141/347 |
| 3,486,730 | 12/1969 | Potash | 251/149.7 |
| 4,293,009 | 10/1981 | Fulton | 141/383 |
| 5,529,096 | 6/1996 | Rowe, Jr. et al. | 141/21 |
| 5,582,223 | 12/1996 | Weh et al. | 141/383 |
| 5,765,611 | 6/1998 | Miller | 141/383 |

FOREIGN PATENT DOCUMENTS

| | | | |
|---|---|---|---|
| 369480 | 7/1963 | Switzerland | 141/383 |
| 597364 | 1/1948 | United Kingdom | 141/383 |

*Primary Examiner*—J. Casimer Jacyna
*Attorney, Agent, or Firm*—Ladas & Parry

[57] ABSTRACT

The invention provides A pneumatically sealed rapidly attachable and demountable A-clamp type yoke for filling compressed gas cylinders having valves designed for interengagement for A-clamp type yokes, the A-clamp type yoke comprising an A-clamp type yoke housing, an opening in the housing for receiving the spout of a tank valve, a stepped cylindrical bore in the housing connected to the opening, a stepped cylindrical piston-like element held in and guided for reciprocal movement in the stepped cylindrical bore, the piston-like element being provided with a through-going conduit for gas flow and with an annular surface surrounding the outlet of the conduit and sized for sealing abutment against a sealing surface of the spout of the tank valve inserted in the opening, a compression spring in the stepped cylindrical bore urging the piston-like element and the annular surface thereof into engagement with the spout, and means of attachment of the yoke to a source hose, the means including a conduit leading to the stepped cylindrical bore, the arrangement being that upon insertion of the spout of the yoke-type tank valve into the housing opening, the spout axially pushes the piston-like element in the direction of the filler hose attachment means, and the annular surface of the piston is then urged by the compression spring into initial sealing engagement with the sealing surface of the spout, whereafter commencement of flow of filling gas from the filler hose increases the pressure of the piston-like element against the sealing surface, thereby increasing the tightness of the seal while concurrently gas flows from the filler hose, via the stepped cylindrical bore, via the conduit in the piston-like element, and into the spout of the tank valve for filling the tank cylinder.

8 Claims, 3 Drawing Sheets

16
21
18
22
32
20
30
24
34
28
26
36
44
42
46
38
10
40

FILLING YOKE FOR COMPRESSED GAS CYLINDERS

BACKGROUND OF THE INVENTION

The present invention relates to a pneumatic A-clamp type yoke useful for charging and recharging compressed gas cylinders or tanks.

More particularly, the invention provides a fast connectable device having pneumatic sealing that is particularly useful for recharging and checking the contents of SCUBA (Self Contained Underwater Breathing Apparatus) air cylinders, but is also applicable for recharging and checking the contents of gas cylinders used by firefighters and rescue personnel, as well as compressed gas cylinders used for many industrial, agricultural and medical purposes.

Cylinders used for supplying breathing air contain air or oxygen-enriched air. Such cylinders are used by divers, firefighters, and rescue personnel and by workers having to carry out their duties in a dangerously contaminated atmosphere. The stored gas is held in a cylindrical cylinder at high pressure, which can be 3000 psi or even higher. High pressure is needed so that a satisfactory quantity of air is available for use from a cylinder of moderate bulk. The gas is supplied for use at near atmospheric pressure after two-stage pressure reduction.

Gas cylinders are fitted with an on-off valve to allow recharge after the contents have been depleted. This valve fulfills the additional function of allowing the cylinder contents to be checked quantitatively by pressure measurement, or for checking gas quality. For example, in the case of cylinders containing air for breathing, gas contents are sometimes checked to determine that the air is dry, clean, and that the standard level of carbon monoxide is not exceeded. The EPA standard for ambient air quality allows 35 ppm maximum carbon monoxide under any circumstances. As a 500 ppm level for an extended period can be fatal, safe practice is to check air quality in cylinders used by divers.

Many valves used on storage cylinders and transmission manifolds for gases and fluids typically use a valve with an annular sealing surface surrounding the orifice. The connection to these valves has historically been made with an A-clamp yoke type of connector that is placed over the top of the valve and aligned with the annular sealing surface. Attachment is carried out by tightening a screw mounted on the bridge of the yoke. Normally the A-clamp yoke is placed over the top on the cylinder valve, the orifice on the front of the valve is aligned with the orifice of the A-clamp yoke device, and is then locked in place by tightening the hand screw on the yoke a number of turns until the device is held tightly in place and the two ports are interconnected, but sealed from the atmosphere. The valve(s) are then opened so as to allow the fluid or gas to flow. When many cylinders are to be handled, such as in the commercial refilling of depleted gas cylinders, the task becomes tedious and time consuming. A similar situation occurs where quantities of cylinders require pressure checking by the attachment, and subsequent removal, of a gauge, or quality checking by temporary attachment to devices such as for example a carbon monoxide detector.

Various types of quick connect/disconnect devices are known. These are described in U.S. Pat. No. 2,288,565 to Green, No. 2,498,596 to Wallach, No. 3,422,864 to Allinquant, No. 3,486,730 to Potash, and in No. 5,529,096 to Rowe, Jr. et al.

Green proposes a valve arrangement for connecting a breathing apparatus to a supply source. There is no indication as to the pressure the device is intended to handle, but his use of swaged connectors indicate that the device is suitable for moderate pressure only.

The device proposed by Wallach has automatic valve actuation. It is intended for tire inflation and requires screwing for connection and disconnection.

Lever operated types as proposed by Allinquant have been tried for filling gas cylinders, but the devices tended to jam and they are no longer in use.

The device proposed by Potash is intended for use only on very low pressure systems, and is not applicable to the very high pressure systems of the present invention.

The quick disconnect valve described by Rowe is part of a special-purpose system allowing cylinder recharge while the user is wearing the self-contained breathing apparatus, and has not been commercially adapted for quantity refilling of unattached cylinders.

Quick-action couplers, usually comprising two half couplings, are widely used in industrial compressed gas systems, and are commercially available for hoses up to 10 inch diameter. A half coupling is attached to the two hose ends requiring connection. Either half contains a leak-proof shut-off valve, usually a simple poppet valve, that closes automatically on separation, and opens on connection. The halves are fitted with an external locking device for interconnection. These couplers, suitable for limited low or medium pressure, are low cost but suffer from disadvantage at higher pressure. Industrial compressed air systems typically operate at around 100 psi, and are thus easily interconnected. However a high connection force must be applied if connection of the halves is to be made when one of the hoses is under high pressure, or an integral bleeder valve is required to relieve local pressure before disconnection can be effected.

When dealing with high pressures used in compressed gas cylinders, reliance for sealing on the force exerted by a compression spring does not provide optimum sealing, as the force provided by such spring is a function of its dimensions, and the spring will provide only the same sealing force whatever the system pressure. For the pressures at which gases are stored in steel cylinders, in some cases up to 3,675 psi, it is far from certain that the compression spring will seal adequately against leaks. Conversely, the mechanical application of high sealing forces where gas pressure is low or moderate causes unnecessary wear of the sealing edges, surfaces and flexible seal elements.

It is therefore one of the objects of the present invention to obviate the disadvantages of prior art gas connectors and to provide an A-clamp type yoke for filling compressed gas cylinders which is quickly and easily connected and disconnected, and which while in use seals against leaks adequately but without excessive force.

It is a further object of the present invention to provide an A-clamp type yoke which is suited for the fast recharging of cylinders for gas, and can be operated by one hand.

Yet a further object of the present invention is to provide a device comprising of but a few simple parts which are easily manufactured at moderate cost.

The present invention achieves the above objects by providing a pneumatically sealed rapidly attachable and demountable A-clamp type yoke for filling compressed gas cylinders having valves designed for interengagement for A-clamp type yokes, said yoke comprising:

a. an A-clamp type yoke housing;

b. an opening in said housing for receiving the spout of a tank valve;

c. a stepped cylindrical bore in the housing connected to its opening;

d. a stepped cylindrical piston-like element held in and guided for reciprocal movement in said stepped cylindrical bore, said piston-like element being provided with a through-going conduit for gas flow and with an annular surface surrounding the outlet of said conduit and sized for sealing abutment against a sealing surface of the spout of the tank valve inserted in said opening;

e. a compression spring in the stepped cylindrical bore urging the piston-like element and the annular surface thereof into engagement with the valve spout; and f. means of attachment of the yoke to a source hose, said means including a conduit leading to the stepped cylindrical bore.

The arrangement is that upon insertion of the spout of the yoke-type tank valve into the housing opening, the spout axially pushes the piston-like element in the direction of the filler hose attachment means, and the annular surface of the piston is then urged by the compression spring into initial sealing engagement with the sealing surface of the spout. Thereafter commencement of flow of filling gas from the filler hose increases the pressure of the piston-like element against the sealing surface, thereby increasing the tightness of the seal while concurrently gas flows from the filler hose, via the stepped cylindrical bore, via the conduit in the piston, and into the spout of the tank valve for filling the tank cylinder.

In a preferred embodiment of the present invention there is provided an A-clamp type yoke wherein the housing opening is further provided with a centering pin configured to engage an aperture in the tank valve spout thereby to facilitate alignment of the yoke housing to the valve spout.

In a most preferred embodiment of the present invention there is provided an A-clamp type yoke wherein the compressed gas cylinder contains air and is of the type used by SCUBA divers.

Yet further embodiments of the invention will be described hereinafter.

It will thus be realized that the novel device of the present invention serves to allow fast and leakproof connection and disconnection of high pressure cylinders to charging means. As will be shown in FIGS. 4 & 6, this can be done using one hand. Compressed air entering the stepped cylinder in the yoke applies sealing pressure to the yoke piston. Where pressure is high, a high sealing force will be applied pneumatically to prevent leakage from the valve spout. Conversely, when more moderate pressure is present in the supply hose, a corresponding lower sealing force is applied, which is beneficial in extending the operating life of the seal components. No operator intervention is required to achieve the correct sealing force.

In applications other than breathing air, the device can be used for cylinders containing oxygen and other commercial gases.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE INVENTION

Figure 1:
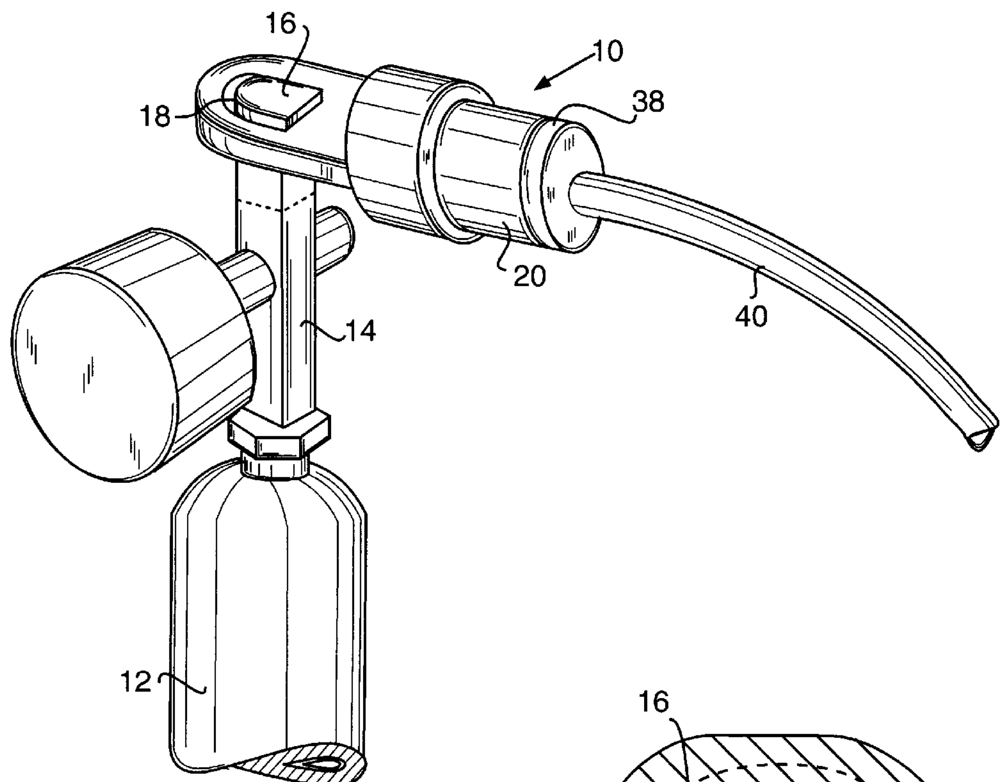
FIG. 1 is a perspective non-detailed view of a preferred embodiment of the yoke according to the invention.
Figure 2:
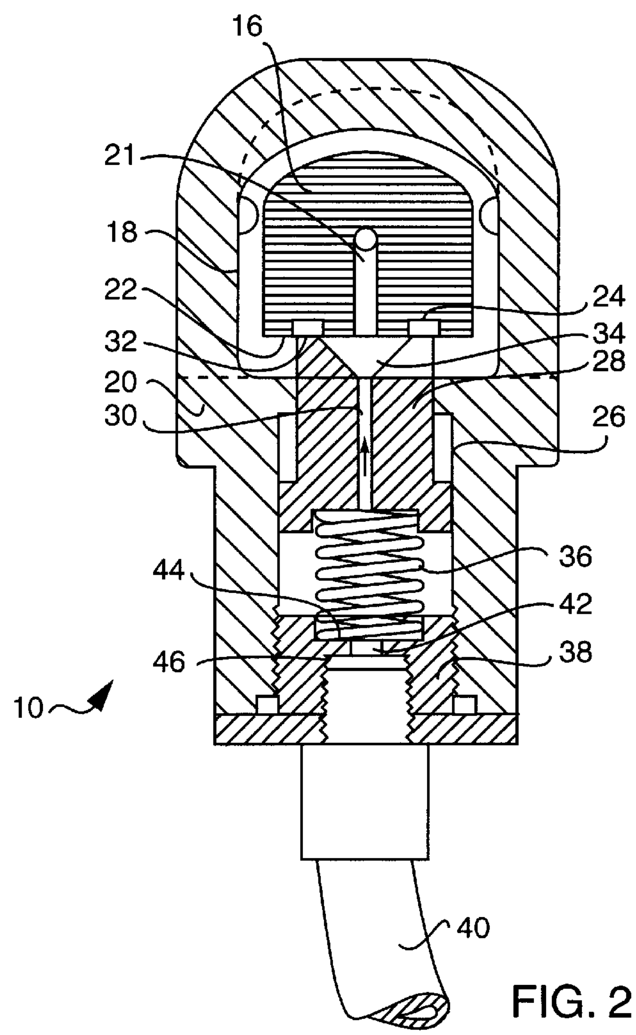
FIG. 2 is a sectional elevational view of the yoke assembled over a valve spout ready for filling.

There is seen, in outline in FIG. 1 and in detail in FIG. 2, a pneumatically sealed rapidly attachable and demountable A-clamp type yoke 10 for filling compressed gas cylinders 12 having yoke-type valves 14. Positioning means (not shown) ensure that the spout is correctly located. Typically the compressed gas cylinder 12 contains air and is of the type used by SCUBA divers, or is of the type used by fire fighting personnel. FIG. 1 shows the valve spout 16 inserted through the opening 18 of the yoke 10.

The A-clamp type yoke 10 has a yoke housing 20. An opening 18 in the housing 20 is configured to receiving the spout 16 of a tank valve 14. The spout 16 receives, or can discharge, gas through a passage 21 terminating at a face 22 provided with a flexible seal element 24.

A stepped cylindrical bore 26 in the housing 20 is connected to opening 18.

A stepped cylindrical piston-like element 28 is held in and guided for reciprocal movement in the stepped cylindrical bore 26. The piston-like element 28 is provided with a through-going conduit 30 for gas flow. When a cylinder 12 is being charged, gas flows through conduit 30 upwards as shown in the figure. An annular surface 32 surrounds the outlet 34 of the conduit 30, surface 32 being sized for sealing abutment against sealing face 22 of the spout 16 of the tank valve 14.

A compression spring 36 in the stepped cylindrical bore 26 urges the piston-like element 28 and the annular surface thereof 32 into engagement with the spout 16. By pressing the element 28 upwards in the direction shown in the figure, the spring 36 provides initial sealing, and additionally serves to retain the spout 16 in place in the yoke 10.

A screwed bushing 38 forms means of attachment of the yoke 10 to a supply filler hose 40. Compressed gas enters the yoke 10 through a central conduit 42 in bushing 38 on its way to the stepped cylindrical bore 26. A shoulder 44 provides the lower seating for spring 36. A screw-thread 46 in bushing 38 provides attachment means for hose 40.

In operation, upon insertion of the spout 16 of the yoke-type tank valve 14 into the housing opening 18, the spout 16 axially pushes the piston-like element 28 in the direction of the bushing 38, downwards as shown in the figure. The annular surface 32 of the piston-like element 28 is then urged by the compression spring 36 into initial sealing engagement with the sealing face 22 of the spout 16. Thereafter commencement of flow of filling gas from the filler hose 40 increases the pressure of the piston-like element 28 against the sealing surface 22, thereby increasing the tightness of the seal. Sealing pressure is high when gas pressure is high, and correspondingly lower for low gas pressure. Concurrently gas flows from the filler hose 40, via the stepped cylindrical bore 26, via the conduit 30, and into the spout 16 of the tank valve 14 for filling the tank cylinder 12.

The gas flow direction referred to above is in effect during gas cylinder 12 filling. Gas flow can however be in the opposite direction; an example of such flow will be described with reference to FIG. 7.

With reference to the rest of the figures, similar reference numerals have been used to identify similar parts.

Figure 3:
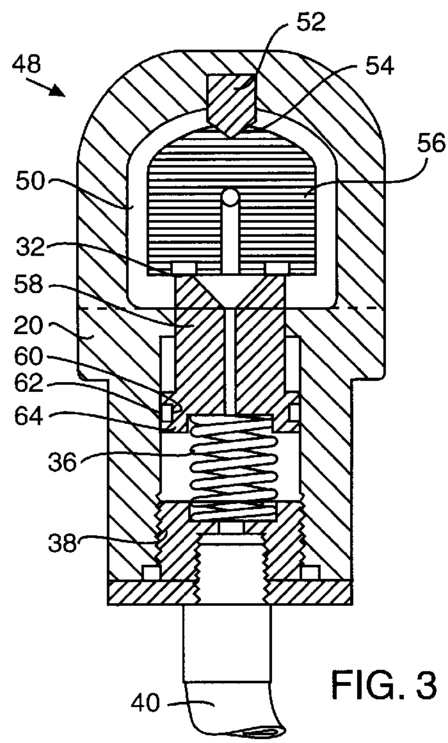
FIG. 3 is the same as FIG. 2 but shows the use of a centering pin.

FIG. 3 illustrates a further embodiment of an A-clamp type yoke 48 similar to 10 described above. However the housing opening 50 is further provided with a centering pin 52 configured to engage an aperture 54 in the tank valve spout 56 thereby to facilitate alignment of the yoke 48 to the spout 56.

The piston-like element 58 includes a recess 60 for holding a flexible seal element 62, thus eliminating gas leakage around the piston shoulder 64.

Figure 4:
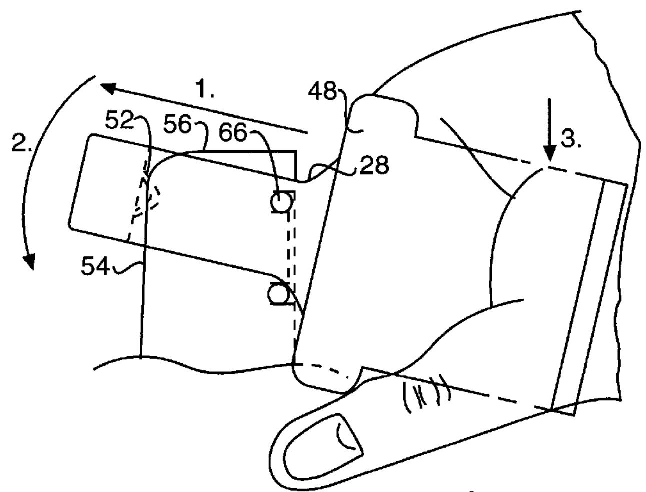
FIG. 4 is an outline view of the embodiment of FIG. 3, but shown in the process of being mounted.

Seen in FIG. 4 is an A-clamp type yoke 48 of the type described with reference to FIG. 3, being mounted using only one hand. The yoke 48 is being held at an angle and being pressed in the direction of arrow 1. The yoke is then rotated in the direction of arrow 2 over the back of the valve spout 56 until level, and until the centering pin 52 engages aperture 54 on the valve spout 56. The yoke 48 is then pushed down in the direction of arrow 3 for final positioning.

Figure 5:
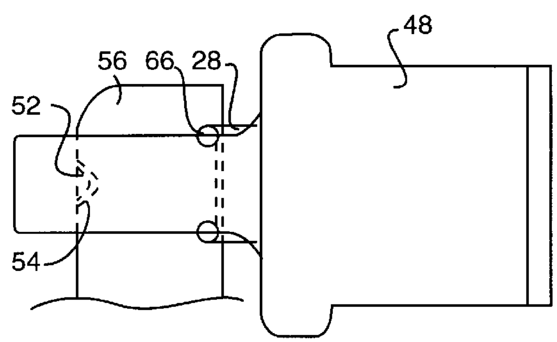
FIG. 5 is an outline view of the same embodiment in position and ready for filling.

Referring now to FIG. 5, there is depicted the yoke 48 described with reference to FIG. 4 correctly mounted. The piston-like element 28 can be seen projecting to contact the flexible seal element 66 of the spout 56. The yoke 48 is ready to commence filling.

Figure 6:
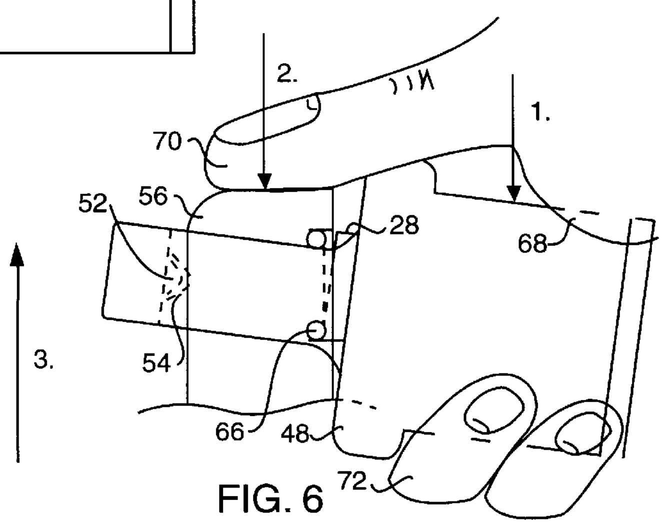
FIG. 6 is an outline view showing the yoke being removed from the valve using one hand.

FIG. 6 shows the yoke 48 being disconnected. The yoke 48 is pressed downwards using the palm of the hand 68 according to arrow 1. The top of the valve 14 is pressed downwards with the thumb 70, while the yoke 48 is gripped and lifted up using the fingers 72 to complete disconnection.

Figure 7:
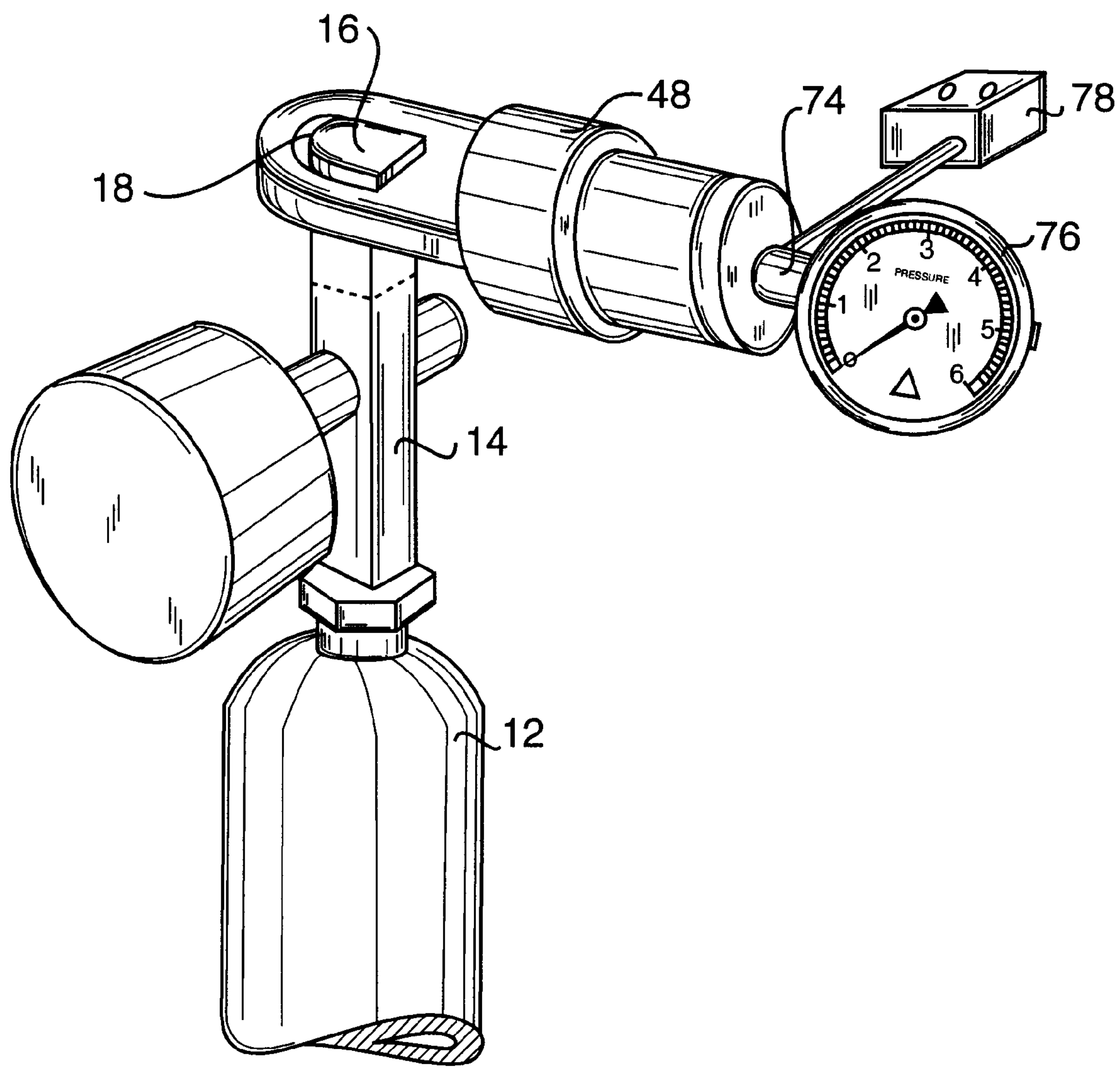
FIG. 7 is an outline view showing the yoke being used for pressure checking full cylinders.

FIG. 7 illustrates a yoke 48 being used for pressure checking of a full gas cylinder 12.

A fitting 74 is connected to a test instrument 76 used for checking the gas contents of cylinder 12. In the present embodiment the test instrument 76 is a pressure gage. Alternatively, the purity of gas contents can be checked when instead of the pressure gage or in addition thereto, an instrument 78, for example a CO detector 78 is attached. There is little gas flow, but what gas flow there is takes place in the direction from the storage cylinder 12, through the tank valve 14, into the yoke 48 and from there to the test instruments 76, 78. Where large quantities of filled cylinders require checking before being issued for use, the quick connection and disconnection yoke of the present invention saves much time and effort.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A pneumatically sealed rapidly attachable and demountable A-clamp type yoke for filling compressed gas cylinders having valves designed for interengagement for A-clamp type yokes, said A-clamp type yoke comprising:

a. an A-clamp type yoke housing;

b. an opening in said housing for receiving the spout of a tank valve;

c. a stepped cylindrical bore in said housing connected to said opening;

d. a stepped cylindrical piston-like element held in and guided for reciprocal movement in said stepped cylindrical bore, said piston-like element being provided with a through-going conduit for gas flow and with an annular surface surrounding the outlet of said conduit and sized for sealing abutment against a sealing surface of said spout of said tank valve inserted in said opening;

e. a compression spring in said stepped cylindrical bore urging said piston-like element and said annular surface thereof into engagement with said spout; and f. means of attachment of said yoke to a source hose, said means including a conduit leading to said stepped cylindrical bore;

the arrangement being that upon insertion of the spout of said yoke-type tank valve into said housing opening, said spout axially pushes said piston-like element in the direction of said filler hose attachment means, and said annular surface of said piston is then urged by said compression spring into initial sealing engagement with said sealing surface of said spout, whereafter commencement of flow of filling gas from said filler hose increases the pressure of said piston-like element against said sealing surface, thereby increasing the tightness of the seal while concurrently gas flows from said filler hose, via said stepped cylindrical bore, via said conduit in said piston-like element, and into the spout of said tank valve for filling the tank cylinder.

2. An A-clamp type yoke according to claim 1, wherein said housing opening is further provided with a centering pin configured to engage an aperture in said tank valve spout thereby to facilitate alignment of said housing to said spout.

3. An A-clamp type yoke according to claim 1, wherein said means of attachment of said yoke to a filler hose are connected to a test instrument used for checking the gas contents of said compressed gas cylinder.

4. An A-clamp type yoke according to claim 1, wherein said piston-like element includes a recess for holding a flexible seal element.

5. An A-clamp type yoke according to claim 1, wherein said compressed gas cylinder contains air and is of the type used by SCUBA divers.

6. An A-clamp type yoke according to claim 1, wherein said compressed gas cylinder contains air and is of the type used by fire fighting personnel.

7. An A-clamp type yoke according to claim 1, wherein said compressed gas cylinder contains oxygen.

8. An A-clamp type yoke according to claim 1, wherein said compressed gas cylinder contains industrial gases.

* * * * *